(12) United States Patent
Young

(10) Patent No.: US 7,939,011 B2
(45) Date of Patent: May 10, 2011

(54) RESIN CONTAINMENT AND INJECTION SYSTEM AND METHOD

(75) Inventor: Matthew J. Young, Brighton (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/541,893

(22) Filed: Aug. 14, 2009

(65) Prior Publication Data

US 2011/0037199 A1    Feb. 17, 2011

(51) Int. Cl.
     *B29C 70/48*      (2006.01)
(52) U.S. Cl. ........ 264/571; 264/257; 425/388; 425/389; 425/405.1
(58) Field of Classification Search .............. 264/257, 264/258, 510, 511, 571; 425/557, 388, 389, 425/405.1
See application file for complete search history.

(56) References Cited

U.S. PATENT DOCUMENTS

| | | | |
|---|---|---|---|
| 6,964,561 B2 * | 11/2005 | Louderback et al. | 425/129.1 |
| 7,334,782 B2 | 2/2008 | Woods | |
| 2005/0073076 A1 | 4/2005 | Woods | |
| 2007/0108665 A1 | 5/2007 | Glain | |
| 2010/0124654 A1 * | 5/2010 | Smith et al. | 264/571 |

FOREIGN PATENT DOCUMENTS

| | | | |
|---|---|---|---|
| DE | 19630840 | * | 2/1998 |
| WO | 2007/054268 | * | 5/2007 |
| WO | 2007/054315 | * | 5/2007 |

OTHER PUBLICATIONS

Electronic translation of DE 19630840.*

\* cited by examiner

*Primary Examiner* — Jill L Heitbrink
(74) *Attorney, Agent, or Firm* — Tung & Associates

(57) ABSTRACT

A resin containment and injection system includes a tool, a resin storage well provided in the tool, a composite layup location provided on the tool and a vacuum bagging film provided over the resin storage well. The vacuum bagging film is configured to define a volume in the resin storage well responsive to establishment of a pressure equilibrium across the vacuum bagging film and substantially eliminate the volume responsive to application of positive pressure against the vacuum bagging film.

19 Claims, 4 Drawing Sheets

RESIN CONTAINMENT AND INJECTION SYSTEM AND METHOD

FIELD

The present disclosure relates to systems and methods for fabricating composite materials. More particularly, the present disclosure relates to a resin containment and injection system and method which utilizes simple tooling.

BACKGROUND

In the composites industry, the standard practice for resin infusion may include preparing the fiber pre-form on a tooling surface and vacuum bagging or preparing the fiber pre-form in a closed mold. To infuse the pre-form, a resin container may be connected to the tooling via a conduit. Once plumbed, air may be evacuated from the pre-form and the conduit and a resin pumped from the resin container, through the conduit and into the space which was formerly occupied by the evacuated air. The resin may be pumped through the conduit by applying air pressure to the resin in the resin container or by operation of a mechanical pump.

For high-temperature structural thermosetting resin systems, the resin container may be heated to attain the correct viscosity of the resin before infusion begins. Once the fiber pre-form is infused with the resin, the infused pre-form and fiber pre-form may be heated to a cure temperature. The resin within the resin container may not be cured with the tool as the volume-to-surface area may result in an exothermic reaction for most thermo-set plastic resin systems used in resin infusion. This may necessitate a process in which the pre-form being infused is placed in an oven and the conduit for the resin infusion is passed from the resin container through the oven wall. The resin and conduit outside the oven may be heated using separate heating units.

The conventional resin-infusion process may be attended by several drawbacks. For example, preparing conduit connections and plumbing may be time-consuming and laborious. Conduits which contain cured resin may not be re-usable and this may contribute cost to the process. Conduit connections in which resin has cured may require cleaning and refurbishment. Significant waste resin may remain within the conduit and the sump of the resin container. Removal of uncured resin from the resin container and disposal of the resin may be difficult and may represent a significant health, safety and environmental risk. Separate heating sources may be required for the resin and the tool. If a mechanical pump is used to infuse the fiber pre-form, the pump may require cleaning and flushing of all resin between jobs or production runs. Plumbing may need separate heating to keep the resin at the correct viscosity as it flows through the conduit.

One solution to some of the drawbacks of the conventional resin infusion process includes increasing the viscosity of the resin until it is a solid at room temperature and placing the solid resin under the vacuum bagging. As the pre-form is heated, the resin melts and the pressure on the vacuum bagging pushes the liquefied resin into the pre-form. However, there may be no control over when or how the resin flows as the pre-form is infused. Another solution includes using a pre-preg material in which the resin is already impregnated into the fabric. The pre-preg material is cured under high pressure to obtain full compaction. However, this process may increase the cost of the composite material product and result in movement/compaction of the pre-form from the initial laid up state. This may render difficult manufacture of complex parts to tight tolerances. Moreover, the system may not be applicable to use in closed molding processes such as Resin Transfer Molding. Additionally, the process may require expensive processing equipment and a premium may be paid for raw materials processed to fabricate pre-impregnated fabrics of aerospace quality.

Therefore, a resin containment and injection system and method are needed in which the resin and the fiber pre-form which is to be impregnated with the resin may be placed together on the same tool to simplify the resin infusion process.

SUMMARY

The present disclosure is generally directed to a resin containment and injection system. An illustrative embodiment of the system includes a tool, a resin storage well provided in the tool, a composite layup location provided on the tool and a vacuum bagging film provided over the resin storage well. The vacuum bagging film is configured to define a volume in the resin storage well responsive to establishment of a pressure equilibrium across the vacuum bagging film and reduce the volume responsive to application of positive pressure against the vacuum bagging film.

In some embodiments, the resin containment and injection system may include a tool; a resin storage well provided in the tool; a composite layup location provided on the tool generally adjacent to the resin storage well; a vacuum bagging film provided over the resin storage well; a vacuum opening extending through the tool generally adjacent to the composite layup location; a control plate provided on the vacuum bagging film over the resin storage well and a control port opening extending through the control plate. The vacuum bagging film is configured to define a volume in the resin storage well responsive to establishment of a pressure equilibrium across the vacuum bagging film by application of vacuum pressure to the control port opening and reduce the volume responsive to application of positive pressure against the vacuum bagging film through the control port opening.

The present disclosure is further generally directed to a resin containment and injection method. An illustrative embodiment of the method includes providing a tool having a composite layup location and a resin storage location, placing a fiber pre-form on the tool at the composite layup location, placing a liquid resin on the tool at the resin storage location, placing a vacuum bag film over the liquid resin at the resin storage location; and infusing the fiber pre-form with the liquid resin by applying positive pressure against the vacuum bag film.

In some embodiments, the resin containment and injection system may include a tool; a resin storage well provided in the tool; a composite layup location provided on the tool generally adjacent to the resin storage well; an outlet resin trap provided in the tool generally adjacent to the composite layup location; a vacuum opening extending through the tool generally adjacent to the outlet resin trap; a vacuum conduit disposed in fluid communication with the vacuum opening; a vacuum bagging film provided over the resin storage well and the composite layup location; a control plate provided on the vacuum bagging film over the resin storage well; a control port opening extending through the control plate; a control port disposed in fluid communication with the control port opening and vacuum sealant tape provided between the tool and the vacuum bagging film and between the vacuum bagging film and the control plate. The vacuum bagging film is configured to define a volume in the resin storage well responsive to establishment of a pressure equilibrium across the vacuum bagging film by application of vacuum pressure to the control port and reduce the volume responsive to application of positive pressure against the vacuum bagging film through the control port and application of vacuum pressure to the vacuum conduit.

In some embodiments, the resin containment and injection method may include providing a tool having a composite layup location, a resin storage location generally adjacent to the composite layup location and an outlet resin trap generally adjacent to the composite layup location; providing a resin flow medium between the composite layup location and the resin storage location; placing a fiber pre-form on the tool at the composite layup location; placing a liquid resin on the tool at the resin storage location; placing a vacuum bag film over the liquid resin and the fiber pre-form; compacting the fiber pre-form by applying vacuum pressure to the fiber pre-form and to the vacuum bag film at the resin storage location; heating the fiber pre-form and the resin to an infusion temperature; infusing the fiber pre-form with the liquid resin by applying positive pressure against the vacuum bag film and vacuum pressure against the fiber pre-form; collecting a portion of the resin in the outlet resin trap; and curing the resin.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
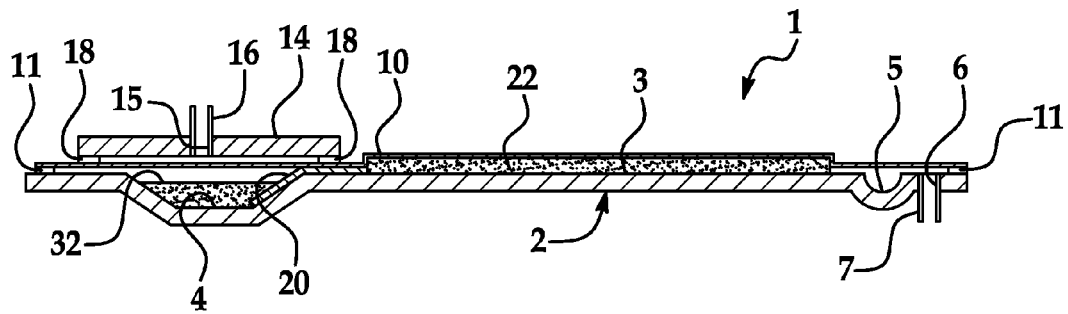
FIG. 1 is a schematic diagram of an illustrative embodiment of the resin containment and injection system, with a fiber pre-form and a resin provided on the tool and vacuum bagging film placed over the fiber pre-form and the resin preparatory to infusing the fiber pre-form with the resin.

Referring initially to FIG. 1, an illustrative embodiment of a resin containment and injection system, hereinafter system, is generally indicated by reference numeral 1. The system 1 may include a tool 2 having a composite layup location 3 and a resin storage well 4 both of which may be integral to the tool 2. The resin storage well 4 may be generally adjacent to or in general proximity to the composite layup location 3. An outlet resin trap 5 may be provided in the tool 2 generally adjacent to the composite layup location 3. A vacuum opening 6 may extend through the tool 2 generally adjacent to the outlet resin trap 5. A vacuum conduit 7 may be disposed in fluid communication with the vacuum opening 6.

Figure 3:
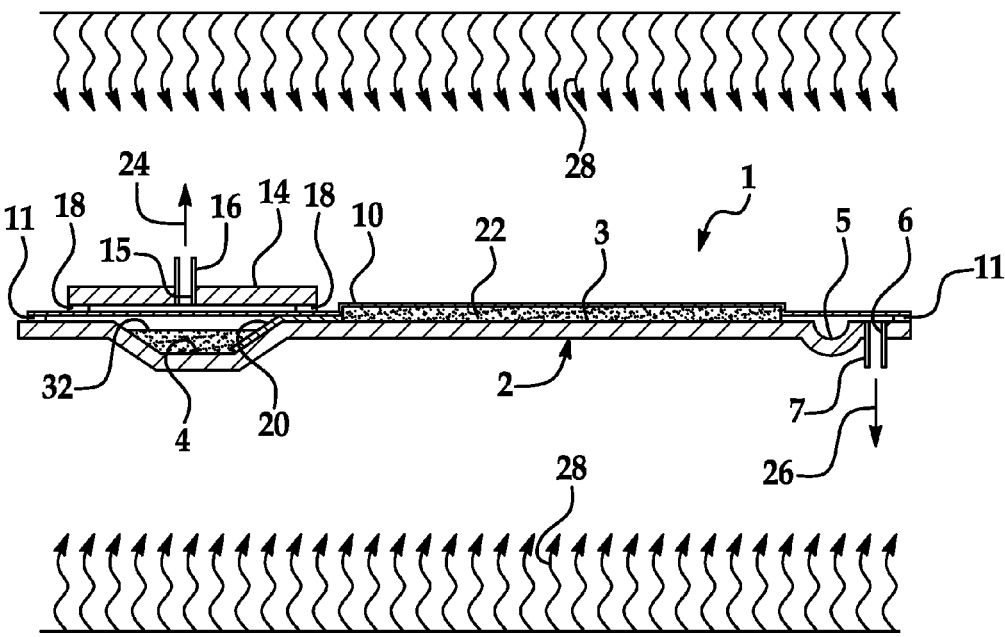
FIG. 3 is a schematic diagram of an illustrative embodiment of the resin containment and injection system, more particularly illustrating application of heat to the tool as vacuum pressure is applied to the vacuum bagging film.
Figure 4:
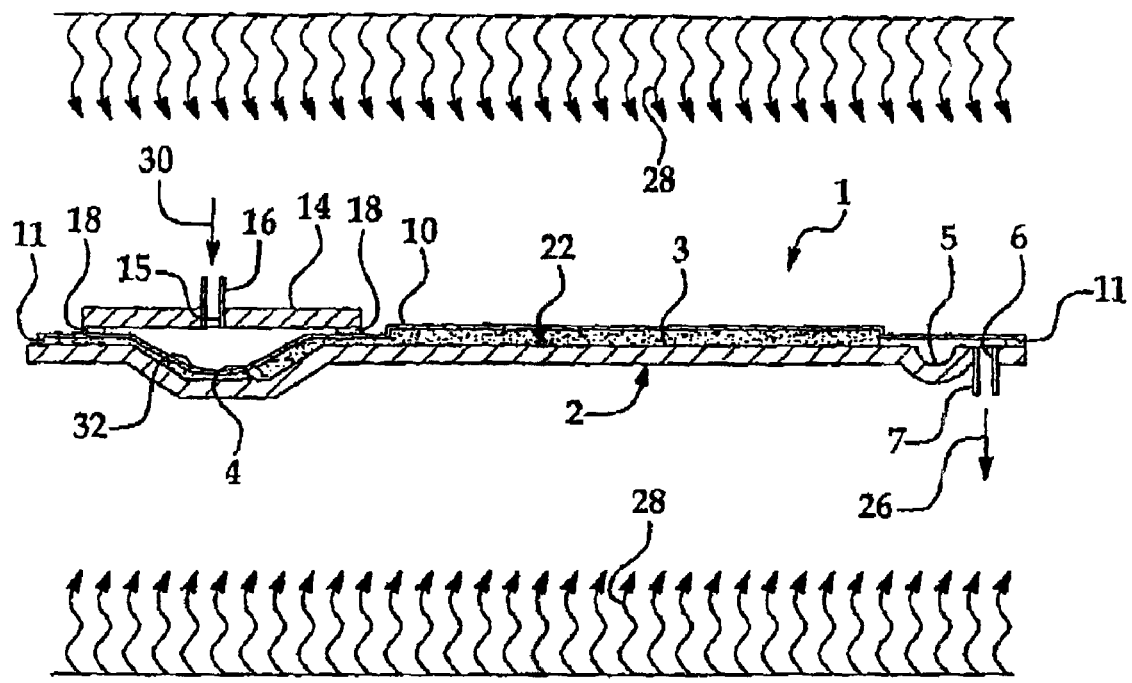
FIG. 4 is a schematic diagram of an illustrative embodiment of the resin containment and injection system, more particularly illustrating application of heat to the tool as the resin is forced into the fiber pre-form by application of positive pressure to the resin.
Figure 5:
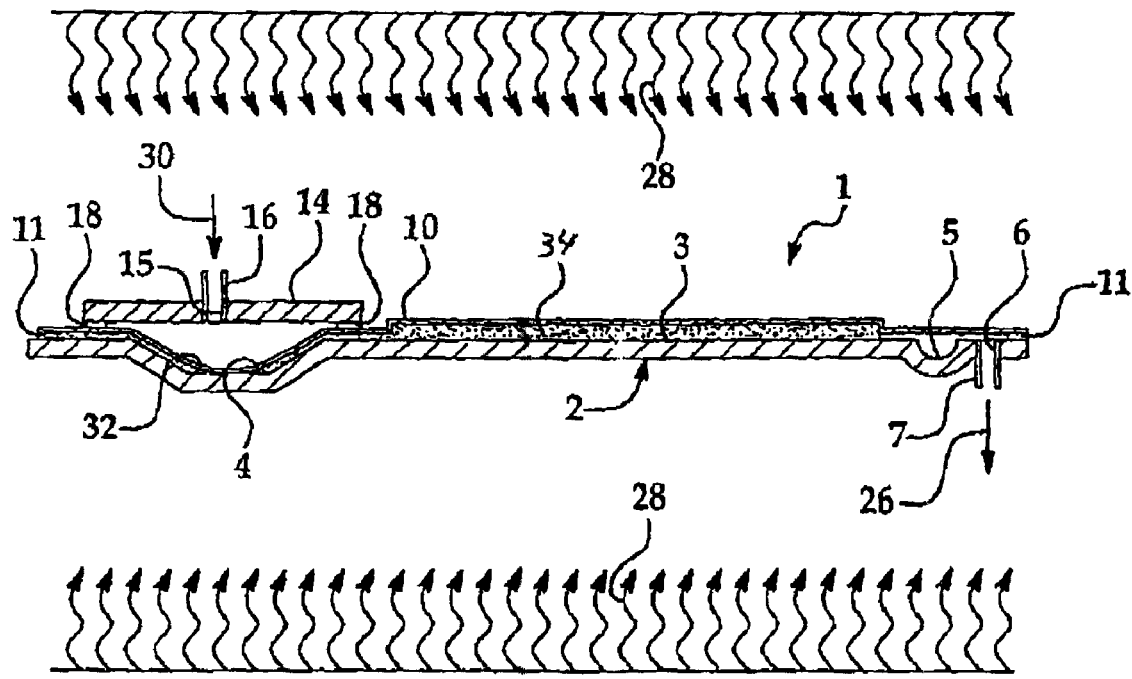
FIG. 5 is a schematic diagram of an illustrative embodiment of the resin containment and injection system, with application of curing heat to the tool to cure the resulting composite layup.

Referring to FIGS. 1-5, in typical application, the system 1 may be used to infuse a fiber pre-form 22 which is placed on the composite layup location 3 with a liquid resin 32 which is placed in the resin storage well 4 of the tool 2 to form a composite layup 34 (FIG. 5). Accordingly, as shown in FIG. 1, the fiber pre-form 22 may be placed on the composite layup location 3 and the resin 32 may be provided in the resin storage well 4 of the tool 2. A vacuum bagging film 10 may be placed over the fiber pre-form 22 and the resin 32. Vacuum sealant tape 11 may be provided between the tool 2 and the edges of the vacuum bagging film 10 to provide a fluid-tight seal between the vacuum bagging film 10 and the tool 2. The resin 32 in the resin storage well 4 of the tool 2 may be disposed in fluid communication with the fiber pre-form 22 through a suitable resin flow medium 20. The outlet resin trap 5 and the vacuum conduit 7 may also be disposed in fluid communication with the fiber pre-form 22.

A control plate 14 may be placed on that portion of the vacuum bagging film 10 which extends over the resin storage well 4. Vacuum sealant tape 18 may be provided between the vacuum bagging film 10 and the control plate 14 to provide a fluid-tight seal between the control plate 14 and the vacuum bagging film 10. A control port opening 15 may extend through the control plate 14. A control port 16 may be disposed in fluid communication with the vacuum baggage film 10 through the control port opening 15.

Figure 2:
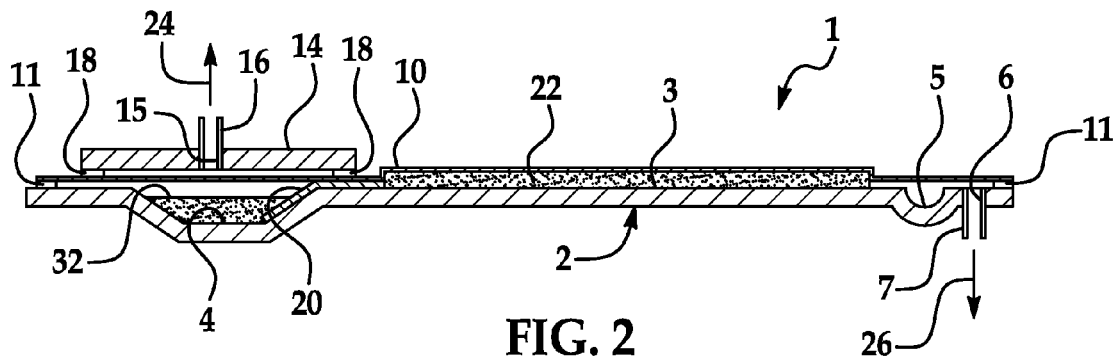
FIG. 2 is a schematic diagram of an illustrative embodiment of the resin containment and injection system, more particularly illustrating application of vacuum pressure to the vacuum bagging film.

As shown in FIG. 2, vacuum pressure 24 may be applied through the control port 16 of the control plate 14 to that portion of the vacuum bagging film 10 which extends over the resin 32 in the resin storage well 4 such that no positive pressure is exerted on the vacuum bagging film 10 against the resin 32. Simultaneously, vacuum pressure 26 may be applied to the fiber pre-form 22 through the vacuum conduit 7. Accordingly, pressure equilibrium may be established between the fiber pre-form 22 and the resin 32 such that the resin 32 remains in place in the resin storage well 4. The vacuum pressure 24, 26 may pull the vacuum bagging film 10 against the fiber pre-form 22 such that the fiber pre-form 22 is compacted between the vacuum bagging film 10 and the tool 2. As shown in FIG. 3, while the vacuum pressure 24 remains applied to the control port 16 and the vacuum pressure 26 remains applied to the vacuum conduit 7, heat 28 may next be applied to the system 1 until the system 1 reaches a selected infusion temperature.

As shown in FIG. 4, after the system 1 reaches the desired infusion temperature, positive pressure 30 (such as <1 atm., for example) may be applied to the vacuum bagging film 10 through the control port 16. Simultaneously, vacuum pressure 26 may be applied to the fiber pre-form 22 through the vacuum conduit 7. The positive pressure 30 which is applied to the vacuum bagging film 10 through the control port 16 may deform the vacuum bagging film 10 and cause the vacuum bagging film 10 to apply positive pressure against the resin 32 in the resin storage well 4. Therefore, the positive pressure of the vacuum bagging film 10 exerted against the resin 32 in the resin storage well 4 forces the resin 32 from the resin storage well 4, through the resin flow medium 20 (FIG. 1) to the fiber pre-form 22 at the composite layup location 3 on the tool 2. Simultaneously, the vacuum pressure 26 which is applied to the fiber pre-form 22 through the vacuum conduit 7 progressively draws the resin 32 through the fiber pre-form 22 until the entire fiber pre-form 22 is infused with the resin 32, as shown in FIG. 5. Some of the resin 32 may be collected in the outlet resin trap 5 of the tool 2. As shown in FIG. 5, heat 28 may be applied to the system 1 to heat the resin-infused fiber pre-form 22 to a curing temperature and cure the resin 32 which was infused into the fiber pre-form 22, forming a composite layup 34. The resin 32 which remains in the resin storage well 4, the resin flow medium 20 (FIG. 1), the outlet resin trap 5 and other surfaces of the tool 2 may also be cured during the curing step.

The resin containment and injection system 1 may have numerous advantages over conventional resin infusion systems and processes. The system 1 may be amenable to simpler and quicker set-up and manufacture of composite layups 34 (FIG. 5). Location of the fiber pre-form 22 and the resin 32 on the same tool 2 may greatly simplify the resin infusion process. Because the fiber pre-form 22 and the resin 32 are located on the same tool 2, separate resin vessels which need heating and control through individual systems may not be required. Safety may be enhanced as the resin well 4 and the outlet resin trap 5 maintain high surface area of resin to volume to eliminate excessive exothermic reaction when bulk resin is cured. Full control of the resin infusion process may be maintained as intended in the CAPRI process. Excessive resin waste associated with the resin infusion process of conventional systems may not be encountered since the sump of the resin pot and the pipe work of the conventional systems may be eliminated. Furthermore, all waste resin may be cured by the end of the process and therefore, pose no risk to personnel or environment. Additional benefits which may accrue to the simplicity of the system 1 include a reduction in capital equipment requirements since no resin pot or vessel plumbing need be used; the viscosity of the resin 32 need not be adjusted so that it is solid at room temperature and therefore, a large variety of resins 32 can be used in conjunction with the tool 2; and the system 1 simplifies the resin infusion process so that manufacture of the composite layup 34 (FIG. 5) may become comparable to pre-preg manufacture without the need for autoclaves or refrigeration of carbon fiber raw materials.

Figure 6:
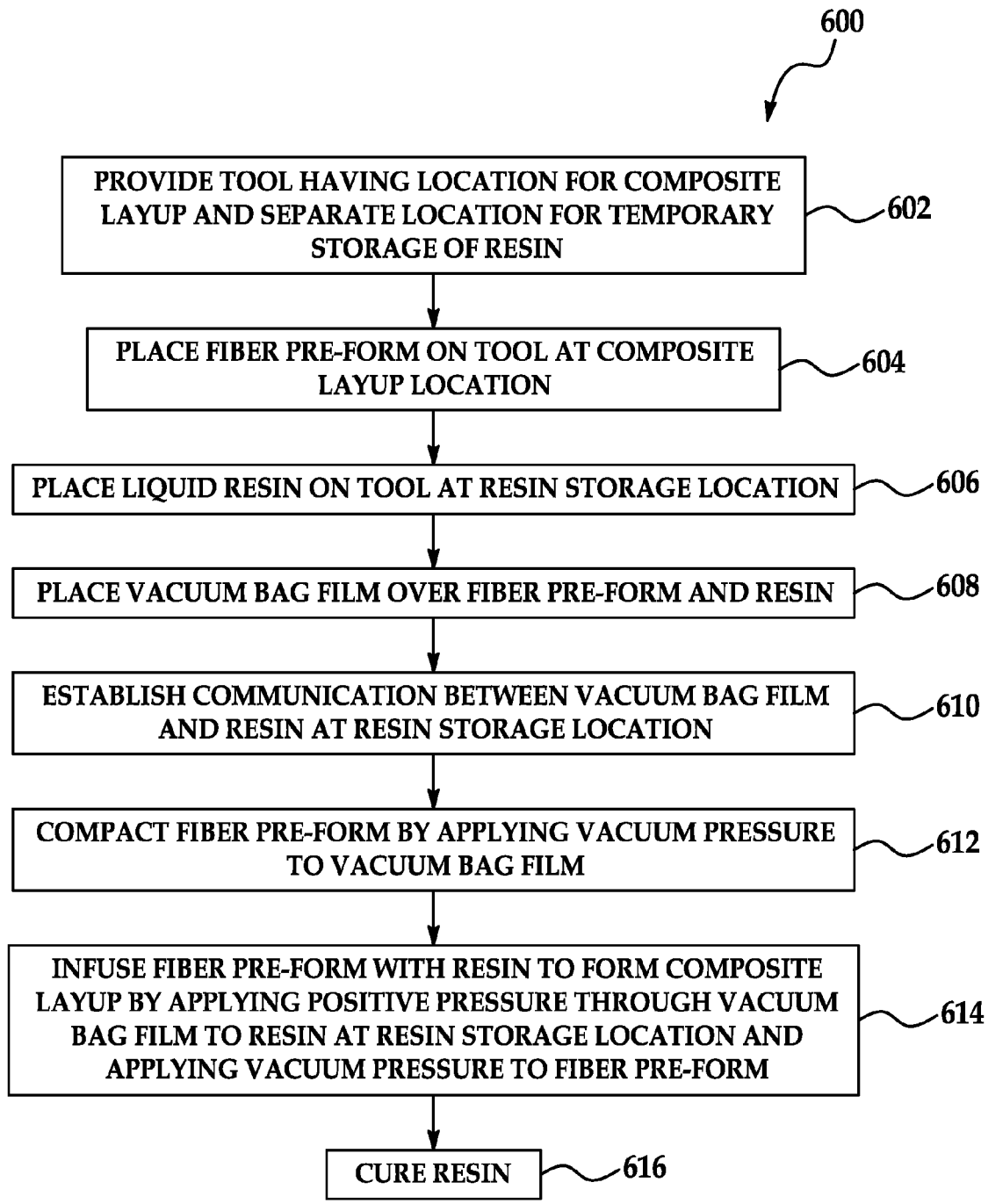
FIG. 6 is a flow diagram of an illustrative embodiment of a resin containment and injection method.

Referring next to FIG. 6, a flow diagram 600 of an illustrative embodiment of a resin containment and injection method is shown. In block 602, a tool having a location for a composite layup and a separate location for temporary storage of resin is provided. In block 604, a fiber pre-form may be placed on the tool at the composite layup location. In block 606, liquid resin may be placed on the tool at the resin storage location. In block 608, a vacuum bag film may be placed over the fiber pre-form and the liquid resin. In block 610, communication may be established between the vacuum bag film and the resin at the resin storage location. In block 612, the fiber pre-form may be compacted by applying vacuum pressure to the vacuum bag film. In block 614, the fiber pre-form may be infused with the resin to form a composite layup by applying positive pressure through the vacuum bag film to the resin at the resin storage location and applying vacuum pressure to the fiber pre-form. In block 616, the resin may be cured.

Figure 7:
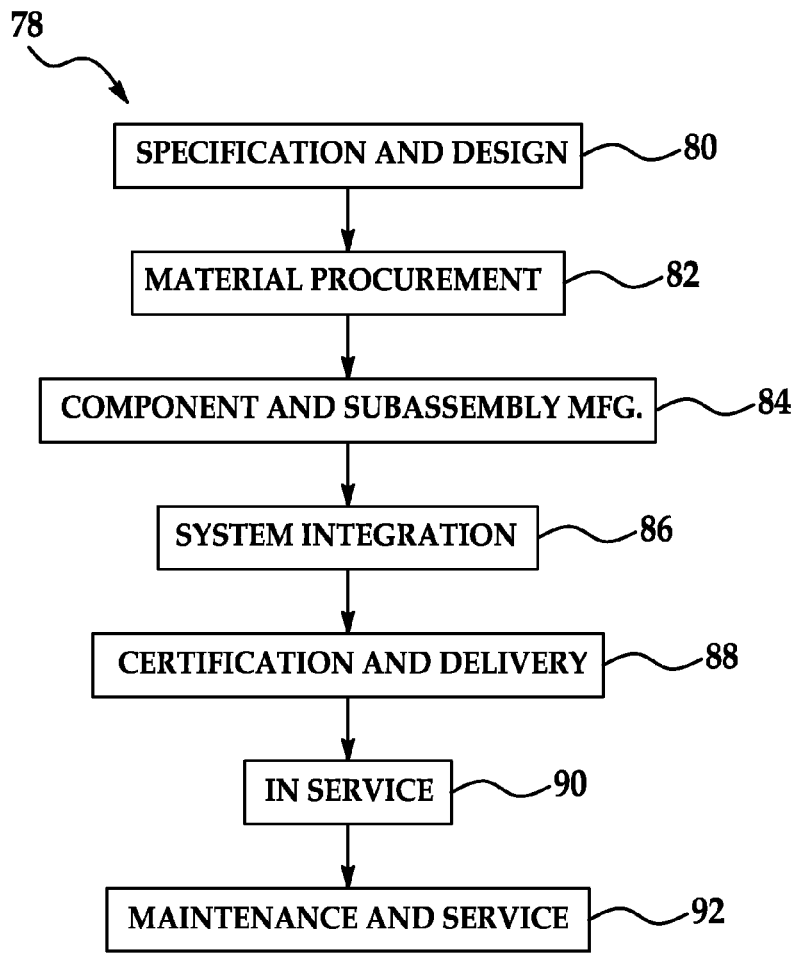
FIG. 7 is a flow diagram of an aircraft production and service methodology.
Figure 8:
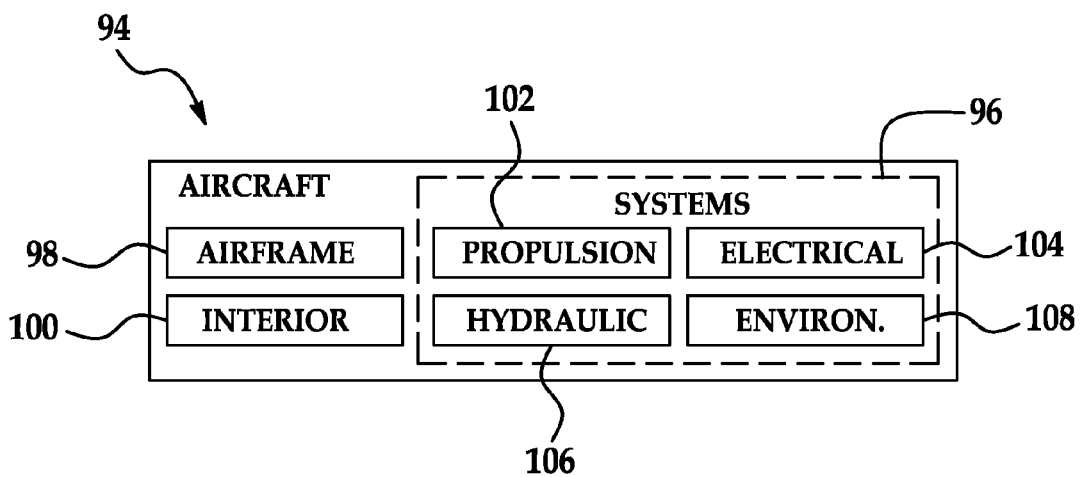
FIG. 8 is a block diagram of an aircraft.

Referring next to FIGS. 7 and 8, embodiments of the disclosure may be used in the context of an aircraft manufacturing and service method 78 as shown in FIG. 7 and an aircraft 94 as shown in FIG. 8. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:
1. A resin containment and injection method, comprising:
providing a tool having a composite layup location and a resin storage location;
placing a fiber pre-form on said tool at said composite layup location;
placing a liquid resin on said tool at said resin storage location;
placing a vacuum bag film over said liquid resin at said resin storage location and said composite layup location, and simultaneously applying pressure with said vacuum bag film to said resin storage location and said fiber pre-form; and
infusing said fiber pre-form with said liquid resin by applying positive pressure against said vacuum bag film and simultaneously applying a vacuum pressure through a vacuum opening extending through said tool generally adjacent to said composite layup location wherein said vacuum opening is in fluid communication with said composite layup location and said resin storage location.

2. The method of claim 1 further comprising compacting said fiber pre-form by applying said vacuum pressure to said fiber pre-form.

3. The method of claim 2 wherein said compacting said fiber pre-form comprises applying vacuum pressure to said vacuum bag film at said resin storage location.

4. The method of claim 1 further comprising providing an outlet resin trap in said tool generally adjacent to said composite layup location and collecting a portion of said resin in said outlet resin trap.

5. The method of claim 1 wherein said infusing said fiber pre-form with said liquid resin comprises heating said fiber pre-form and said resin to an infusion temperature.

6. The method of claim 1 further comprising curing said resin.

7. A resin containment and injection method, comprising:
   providing a tool having a composite layup location, a resin storage location generally adjacent to said composite layup location and an outlet resin trap generally adjacent to said composite layup location;
   providing a resin flow medium between said composite layup location and said resin storage location;
   placing a fiber pre-form on said tool at said composite layup location;
   placing a liquid resin on said tool at said resin storage location;
   placing a vacuum bag film over said liquid resin and said fiber pre-form;
   compacting said fiber pre-form by simultaneously applying vacuum pressure to said fiber pre-form and to said vacuum bag film at said resin storage location;
   heating said fiber pre-form and said resin to an infusion temperature;
   infusing said fiber pre-form with said liquid resin by applying positive pressure against said vacuum bag film and simultaneously applying vacuum pressure against said fiber pre-form through a vacuum opening extending through said tool generally adjacent to said composite layup location wherein said vacuum opening is in fluid communication with said composite layup location and said resin storage location;
   collecting a portion of said resin in said outlet resin trap; and
   curing said resin.

8. A resin containment and injection system, comprising:
   a tool;
   a resin storage well provided in said tool;
   a composite layup location provided on said tool;
   a vacuum bagging film provided over said resin storage well and said composite layup location, said vacuum bagging film adapted to simultaneously apply pressure to said resin storage well and a composite layup disposed in said composite layup location; and
   wherein said vacuum bagging film is configured to define a volume in said resin storage well responsive to establishment of a pressure equilibrium across said vacuum bagging film and reduce said volume responsive to application of positive pressure against said vacuum bagging film; and,
   further comprising a vacuum opening extending through said tool generally adjacent to said composite layup location wherein said vacuum opening is in fluid communication with said composite layup location and said resin storage well.

9. The system of claim 8 further comprising a resin flow medium provided on said tool between said resin storage well and said composite layup location.

10. The system of claim 8 further comprising an outlet resin trap provided in said tool generally adjacent to said composite layup location.

11. The system of claim 8 further comprising a vacuum conduit disposed in fluid communication with said vacuum opening.

12. The system of claim 8 further comprising a control plate provided on said vacuum bagging film over said resin storage well and a control port opening extending through said control plate.

13. The system of claim 12 further comprising a control port disposed in fluid communication with said control port opening.

14. A resin containment and injection system, comprising:
   a tool;
   a resin storage well provided in said tool;
   a composite layup location provided on said tool generally adjacent to said resin storage well;
   a vacuum bagging film provided over said resin storage well and said composite layup location, said vacuum bagging film adapted to simultaneously apply pressure to said resin storage well and a composite layup disposed in said composite layup location;
   a vacuum opening extending through said tool generally adjacent to said composite layup location wherein said vacuum opening is in fluid communication with said composite layup location and said resin storage well;
   a control plate provided on said vacuum bagging film over said resin storage well;
   a control port opening extending through said control plate; and
   wherein said vacuum bagging film is configured to define a volume in said resin storage well responsive to establishment of a pressure equilibrium across said vacuum bagging film by application of vacuum pressure to said control port opening and reduce said volume responsive to application of positive pressure against said vacuum bagging film through said control port opening.

15. The system of claim 14 further comprising a resin flow medium provided on said tool between said resin storage well and said composite layup location.

16. The system of claim 14 further comprising an outlet resin trap provided in said tool generally adjacent to said composite layup location.

17. The system of claim 14 further comprising a vacuum conduit disposed in fluid communication with said vacuum opening.

18. The system of claim 14 further comprising a control port disposed in fluid communication with said control port opening.

19. A resin containment and injection system, comprising:
   a tool;
   a resin storage well provided in said tool;
   a composite layup location provided on said tool generally adjacent to said resin storage well;
   an outlet resin trap provided in said tool generally adjacent to said composite layup location;
   a vacuum opening extending through said tool generally adjacent to said outlet resin trap wherein said vacuum opening is in fluid communication with said composite layup location and said resin storage well;
   a vacuum conduit disposed in fluid communication with said vacuum opening;
   a vacuum bagging film provided over said resin storage well and said composite layup location, said vacuum bagging film adapted simultaneously to apply pressure to said resin storage well and a composite layup disposed in said composite layup location;

a control plate provided on said vacuum bagging film over said resin storage well;

a control port opening extending through said control plate;

a control port disposed in fluid communication with said control port opening;

vacuum sealant tape provided between said tool and said vacuum bagging film and between said vacuum bagging film and said control plate; and wherein said vacuum bagging film is configured to define a volume in said resin storage well responsive to establishment of a pressure equilibrium across said vacuum bagging film by application of vacuum pressure to said control port and reduce said volume responsive to application of positive pressure against said vacuum bagging film through said control port and application of vacuum pressure to said vacuum conduit.

* * * * *